United States Patent [19]

Boggs et al.

[11] Patent Number: 4,536,194
[45] Date of Patent: Aug. 20, 1985

[54] SYSTEM FOR CONTROLLING THE COMPOSITION OF A FUEL GAS PRODUCED BY A JET COMPRESSOR SYSTEM

[75] Inventors: William E. Boggs, Murrysville; Everett L. Keener, Monroeville, both of Pa.

[73] Assignee: United States Steel Corporation, Pittsburgh, Pa.

[21] Appl. No.: 560,657

[22] Filed: Dec. 12, 1983

[51] Int. Cl.³ .............................................. B01F 3/02
[52] U.S. Cl. .................. 48/180.1; 48/189.4; 48/197 R; 137/3; 137/93
[58] Field of Search ............... 48/189.1, 189.4, 196 R, 48/197 R, 196 FM, 197 FM, 199 FM, 180.1; 137/3, 88, 91, 93, 101.19, 6; 422/111

[56] References Cited

U.S. PATENT DOCUMENTS

| | | | |
|---|---|---|---|
| 459,791 | 9/1891 | Painter | 48/189.1 |
| 947,014 | 1/1910 | Faber | 48/189.1 |
| 1,772,101 | 8/1930 | Knapp | 48/197 FM |
| 1,876,037 | 9/1932 | Becker | 48/189.1 |
| 1,908,357 | 5/1933 | Hornbruch | 431/90 |
| 2,087,681 | 7/1937 | Bleyer | 48/189.1 |
| 2,193,240 | 3/1940 | Schmidt | 48/180 |
| 2,228,171 | 1/1941 | Lutherer et al. | 48/180 |
| 2,306,366 | 12/1942 | Becker | 202/144 |
| 2,342,214 | 2/1944 | Otto | 202/151 |
| 2,554,818 | 5/1951 | Davis | 202/12 |
| 3,119,672 | 1/1964 | Peirce | 48/189.1 |
| 3,192,127 | 6/1965 | Van Ackeren et al. | 202/12 |
| 3,556,947 | 1/1971 | Kumper | 201/1 |
| 3,607,660 | 9/1971 | Kumper | 201/1 |
| 3,647,053 | 3/1972 | Palumbo | 202/263 |
| 3,722,811 | 3/1973 | Osburn | 236/14 |
| 3,734,675 | 5/1973 | Osburn | 431/12 |
| 3,844,304 | 10/1974 | Boothe | 137/3 |
| 4,045,292 | 8/1977 | Matsushita et al. | 201/1 |
| 4,187,542 | 2/1980 | Ball et al. | 364/502 |
| 4,277,254 | 7/1981 | Hanson | 48/189.1 |

OTHER PUBLICATIONS

"Fast-Reading Calorimeter Improves Combustion, Saves Energy", Iron and Steel Engineer, Feb., 1981.
"Dofasco Fine Tunes its Cokemaking Act with Feed Forward Combustion Control", 33 Metal Producing, Jul., 1980, p. 64.

Primary Examiner—Jay H. Woo
Assistant Examiner—Joye L. Woodard
Attorney, Agent, or Firm—W. Gary Goodson; George D. Dickos

[57] ABSTRACT

A method of providing a mixture of lean and rich gas of a desired composition by means of a jet compressor system comprising two or more jet compressors comprising:

(1) adjusting the jet compressor system being used to mix the lean and rich gas to provide a leaner gas mixture than the desired composition;
(2) then adding a predetermined amount of rich gas to the leaner gas mixture to attempt to obtain the desired composition; and
(3) varying the amount of rich gas added to the leaner gas in response to the measurement of gas properties in the jet compressor system to thereby more nearly obtain a gas of the desired composition. Preferably the lean gas comprises air, blast furnace gas, or BOF gas, and the rich gas comprises methane, natural gas, propane, or butane.

8 Claims, 2 Drawing Figures

SYSTEM FOR CONTROLLING THE COMPOSITION OF A FUEL GAS PRODUCED BY A JET COMPRESSOR SYSTEM

FIELD OF THE INVENTION

This invention relates to a control system for a jet compressor system whereby a mixture of a lean and rich gas of a desired composition is produced.

BACKGROUND OF THE INVENTION

Jet Compressors, also called Thermo-Compressors, are commonly used to provide mixture of air and a high quality gaseous fuel such as natural gas to supplement the volume of a lower quality gaseous fuel such as coke-oven-gas. In these devices a jet of the motive gas directed from a nozzle into the throat of a venturi section, called the diffuser, produces suction which draws air or other gas into the diffuser thereby diluting the motive gas. The mixed gas thus produced is discharged from the exit end of the diffuser into a mixed gas manifold whence it flows into the gas distribution system and eventually to the users. The mixture provided should match a combustion index, such as the Wobbe Index (Calorific Valve/$\sqrt{\text{Specific Gravity}}$) or the Air Requirement Index (Stoichiometric Air/$\sqrt{\text{Specific Gravity}}$) of the lower quality gas, such as coke-oven-gas, being supplemented.

The manufacturers of jet compressors adjust nozzle size, diffuser throat size, and nozzle to throat distance to provide a mixture of the desired composition as long as the motive force, mixed gas manifold pressure (also called the discharge pressure), and the pressure drop in the air intake are maintained within rather narrow limits. The composition of the mixture is very sensitive to the discharge pressure. If the mixed gas manifold pressure is allowed to rise above the design discharge pressure, the suction pressure is reduced, less air is entrained, and the mixed gas gets rich. Conversely, if the manifold pressure is allowed to fall very much below the design discharge pressure the suction increases, more air is entrained, and the mixed gas gets leaner. Either of these conditions can cause the user to waste fuel.

In practical operation rapid changes in usage, supply of the source gas, or other such factors are common, which results in fuel wastage.

SUMMARY OF THE INVENTION

This invention relates to a method of producing a mixture of lean and rich gas of a desired composition by means of a jet compressor system comprising two or more jet compressors comprising:

(1) adjusting the jet compressor system being used to mix the lean and rich gas to provide a leaner gas mixture than the desired composition;

(2) then adding a predetermined amount of rich gs to the leaner gas mixture to attempt to obtain the desired composition; and (3) varying the amount of rich gas added to the leaner gas in response to measurements of gas properties in the jet compressor system to thereby achieve a gas mixture of the desired composition. Preferably the properties measured includes the flow of rich gas going into the jet compressor system and the pressure of the mixed gases from the jet compressor system. Additionally it is preferred to measure the composition of the gas stream after the addition of the rich gas, then to compare the measured composition with the desired composition, then to vary the composition of the gas coming from the jet compressor system or to vary the amount of rich gas added, to more nearly obtain a gas of the desired composition. Preferably the lean gas comprises air, blast furnace gas or BOF gas, and the rich gas comprises methane, natural gas, propane, or butane.

This invention overcomes the problem of fuel wasteage caused by wide variation in manifold pressure.

DESCRIPTION OF THE PREFERRED EMBODIMENTS

The jet compressor of the jet compressor system of this invention preferably comprises a hollow elongated chamber, such chamber having a low pressure opening into the chamber and adapted for connection to a source of lower pressure gas and a high pressure gas opening into the chamber adapted for connection to a source of high pressure gas and being provided with means for adjusting the ratio of low pressure gas to high pressure gas, such chamber proving means for mixing the high pressure and low pressure gas, and such chamber having an outlet for removing the mixed gas from such chamber for use or distribution for further use. Preferably, the high pressure gas is rich gas such as one being at least about 60% methane, and most preferably a substantially pure methane stream. Preferably, the low pressure gas is a lean gas having at least about 60% air, and most preferably a substantially pure air stream.

The jet compressors in the preferred jet compressor system of this invention are of different sizes in order to allow for more variable capacity of the system. For example, in a system of nine jet compressors, each compressor is stepped up in size by double the capacity of the preceding compressor. Thus if the initial compressor has a capacity of 1, the other eight compressors would have capacities of 2, 4, 8, 16, 32, 64, 128, and 256. These are operated in an on-off mode.

Figure 1:
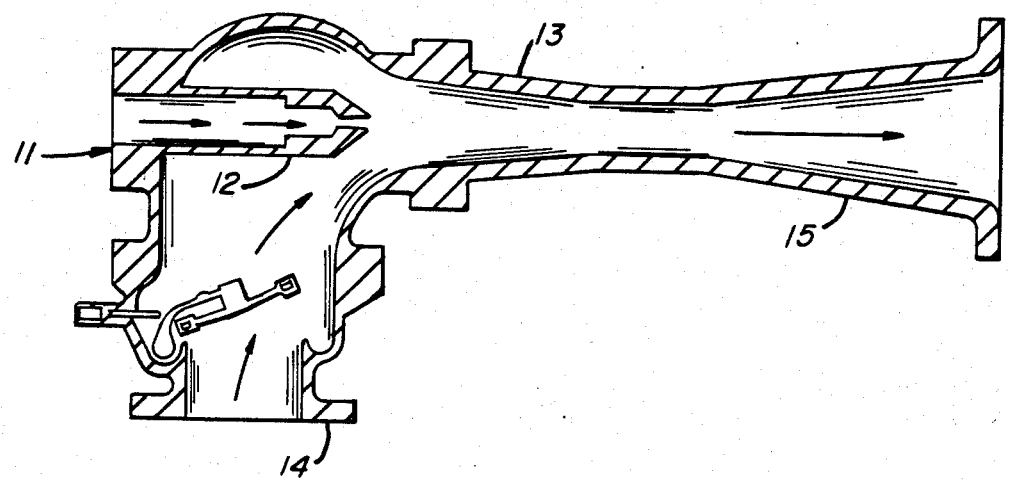
FIG. 1 is a representation of a typical jet compressor.

FIG. 1 is a representation which shows the operation of a typical jet compressor. High pressure rich motive gas passes from inlet 11 through nozzle 12 into the throat of a venturi section 13, called a diffuser, which produces suction which draws air or other lean gas from inlet 14, into the diffuser 13 to thereby dilute the motive gas. The mixed gas thus produced is discharged from the outlet 15 into a mixed gas manifold and onto a gas distribution system and eventually to users.

It has been found that the control of the mixed gas manifold pressure in many locations using jet compressors is not precise enough to assure the production of mixed gas of fixed composition.

Figure 2:
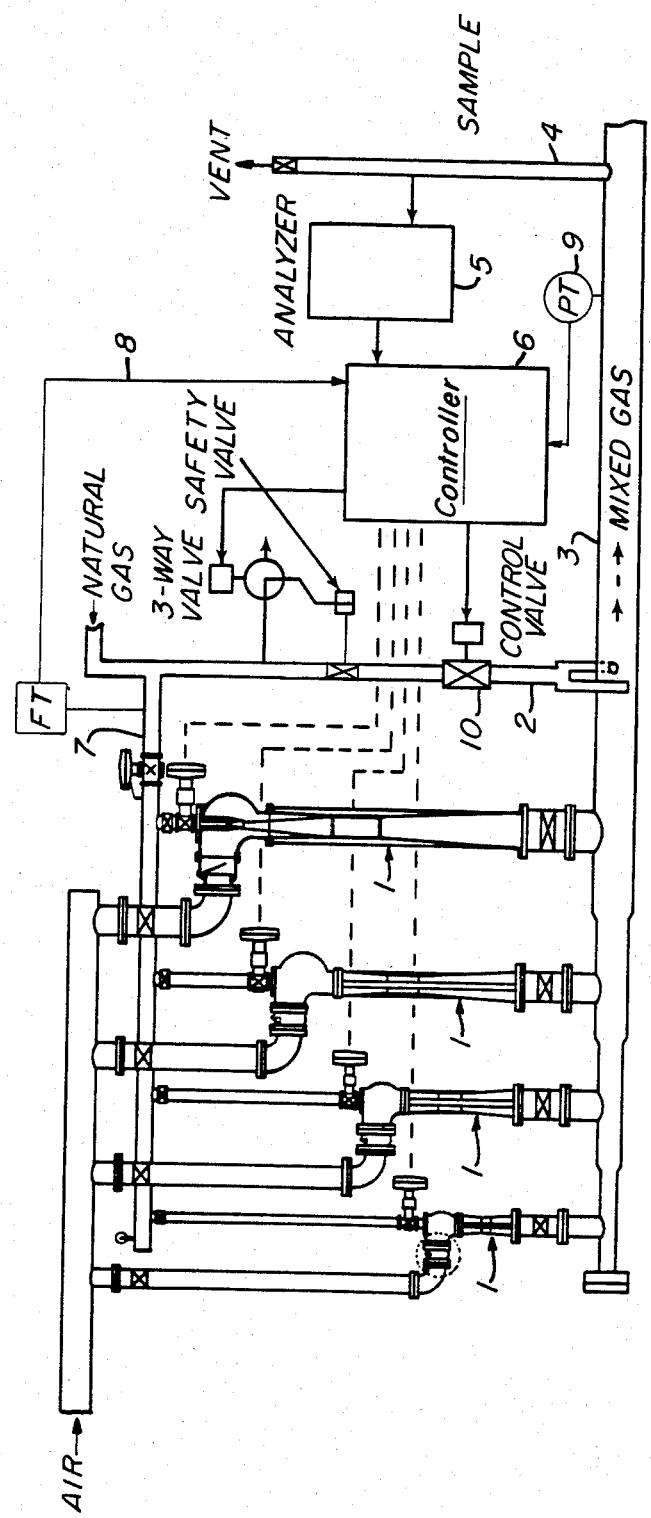
FIG. 2 is a representation of a control system according to this invention for controlling a jet compressor system.

In FIG. 2 jet compressors 1 such as those shown in FIG. 1 are ordered or modified to provide a leaner mixture of gas than is required by the user. Supplementary gas is added by means of crossed spargers 2 in the mixed gas manifold 3 to bring the mixture back up to the desired composition. At an appropriate distance down stream from the injection point, a sample of the mixed gas is withdrawn continuously by outlet 4 from manifold 3 and analyzed or has its combustion index measured at analyzer 5. This information is fed back into the controller 6. A motive gas stream 7 has its flow measured and the pressure of the mixed gas stream of manifold 3 is measured. These measurements are fed forward through lines 8 and 9 to the controller 6. The flow of motive gas can be determined from (1) the flow in the motive gas stream 7; (2) the number of jet compressors 1 that are operating or; (3) the flow of mixed gas in the mixed gas manifold 3. The controller determines the amount of additional gas needed to achieve the desired composition of mixed gas and adjusts the supplementary injection control valve 10 accordingly. The information fed back from the analyzer 5 is utilized in the controller 6 to trim the flow of the supplemental gas and correct for any errors in the feed forward control calculations.

We claim:

1. Method of providing a mixture of lean gas and rich gas of a desired composition by means of a jet compressor system comprising two or more jet compressors, and wherein each such jet compressor operates by passing said rich gas at high pressure through a nozzle into the throat of a venturi section to thereby produce suction which draws said lean gas at a lower pressure into said venturi section to thereby dilute said rich gas to a predetermined composition, comprising:
   (1) adjusting the jet compressor system being used to mix said lean gas and said rich gas to provide a leaner gas mixture than said desired composition;
   (2) then adding a predetermined amount of said rich gas to said leaner gas mixture to attempt to obtain said desired composition; and
   (3) adding a varying amount of said rich gas to said leaner gas mixture in response to measurements of the flow of said rich gas going into said jet compressor system and the pressure of the mixed gases after the addition of said rich gas to thereby obtain the gas mixture having said desired composition.

2. Method as in claim 1 wherein said lean gas comprises at least one member of the group consisting of air, blast furnace gas, and BOF gas.

3. Method as in claim 2 wherein said rich gas comprises at least one member of the group consisting of methane, natural gas, propane, and butane.

4. Method as in claim 1 wherein said lean gas comprises air and said rich gas comprises methane.

5. Method of providing a mixture of lean and rich gas of a desired composition by means of a jet compressor system comprising two or more jet compressors, and wherein each such jet compressor operates by passing said rich gas at high pressure through a nozzle into the throat of a venturi section to thereby produce suction which draws said lean gas at a lower pressure into said venturi section to thereby dilute said rich gas to a predetermined composition, comprising:
   (1) adjusting the jet compressor system being used to mix said lean and rich gas to provide a leaner gas mixture than said desired composition;
   (2) then adding a predetermined amount of said rich gas to said leaner gas mixture to attempt to obtain said desired composition.
   (3) measuring the flow of said rich gas going into said jet compressor system and the pressure of the mixed gases after the addition of said rich gas;
   (4) adding a varying amount of said rich gas to said leaner gas mixture in response to the measurements of step 3 to thereby obtain the gas mixture having said desired composition;
   (5) measuring the composition of gas stream after the addition of said rich gas;
   (6) comparing the composition measured with said desired composition; and
   (7) varying the composition of the leaner gas mixture coming from the jet compressor system or varying the amount of rich gas added, to more nearly obtain a gas of said desired composition.

6. Method as in claim 5 wherein said lean gas comprises at least one member of the group consisting of air, blast furnace gas, and BOF gas.

7. Method as in claim 6 wherein said rich gas comprises at least one member of the group consisting of methane, natural gas, propane, and butane.

8. Method as in claim 5 wherein said lean gas comprises air and said rich gas comprises methane.

* * * * *